United States Patent [19]

Gudmundson et al.

[11] Patent Number: 5,392,453
[45] Date of Patent: Feb. 21, 1995

[54] METHOD OF EFFECTING HANDOVER IN A MOBILE MULTILAYER CELLULAR RADIO SYSTEM

[75] Inventors: Bjorn O. P. Gudmundson, Sollentuna; Hakan Eriksson, Vallentuna; Olof E. Grumlund, Kista, all of Sweden

[73] Assignee: Telefonaktiebolaget L M Ericsson, Stockholm, Sweden

[21] Appl. No.: 901,075

[22] Filed: Jun. 19, 1992

[30] Foreign Application Priority Data

Jun. 20, 1991 [SE] Sweden ................... 9101910

[51] Int. Cl.⁶ .............. H04B 7/00; H04Q 7/02; H04Q 9/00
[52] U.S. Cl. ................. 455/33.2; 455/54.2; 455/56.1; 379/59; 379/63
[58] Field of Search ............ 455/33.1, 33.2, 33.3, 455/54.1, 54.2, 56.1, 62, 63, 34.1, 34.2; 379/59, 60, 61, 63

[56] References Cited

U.S. PATENT DOCUMENTS

| | | | |
|---|---|---|---|
| 4,144,411 | 3/1979 | Frenkiel | 455/33.3 |
| 4,144,496 | 3/1979 | Cunningham et al. | 455/33.3 |
| 4,613,990 | 9/1986 | Halpern | 455/33.2 |
| 4,797,947 | 1/1989 | Labedz | 455/56.1 |
| 4,811,380 | 3/1989 | Spear . | |
| 5,189,734 | 2/1993 | Bailey et al. | 455/56.1 |
| 5,278,991 | 1/1994 | Ramsdale et al. | 455/33.2 |

FOREIGN PATENT DOCUMENTS

| | | |
|---|---|---|
| 0115139 | 8/1984 | European Pat. Off. . |
| 0418096 | 3/1991 | European Pat. Off. . |
| 0471656 | 2/1992 | European Pat. Off. . |

OTHER PUBLICATIONS

H. Eriksson et al. "Development of Radio Access in Cellular Systems—the Basis of Personal Telephony" *Ericsson Review*, pp. 2-9 (1992).
H. Jansson et al. "The Future of Cellular Telephony" *Ericsson Review*, pp. 42-52 (1990).
United, Idle Mode Cell Reselection For Microcells, Sep. 1991.

Primary Examiner—Edward F. Urban
Assistant Examiner—Lisa Charouel
Attorney, Agent, or Firm—Burns, Doane, Swecker & Mathis

[57] ABSTRACT

A method of effecting handover in a mobile telephone system comprising fixed base stations and mobile stations. The system includes several layers of radio cells, where a cell in a given layer covers several cells in a nearest underlying or subordinate layer. A mobile station moving in a microcell may find it difficult to handover to another microcell in the same cell layer, when the signal strength of the established connection in the first microcell is rapidly weakened. No information concerning the target base station can be transmitted. According to the proposed method, handover is effected to a cell in the nearest overlying cell layer, a so-called umbrella cell, either permanently (the mobile is moving quickly) or temporarily (the mobile is moving slowly). In the latter case, handover is made back to a microcell. The handover command is either transmitted from the base station of the microcell having elevated power, or from the target base station.

3 Claims, 2 Drawing Sheets

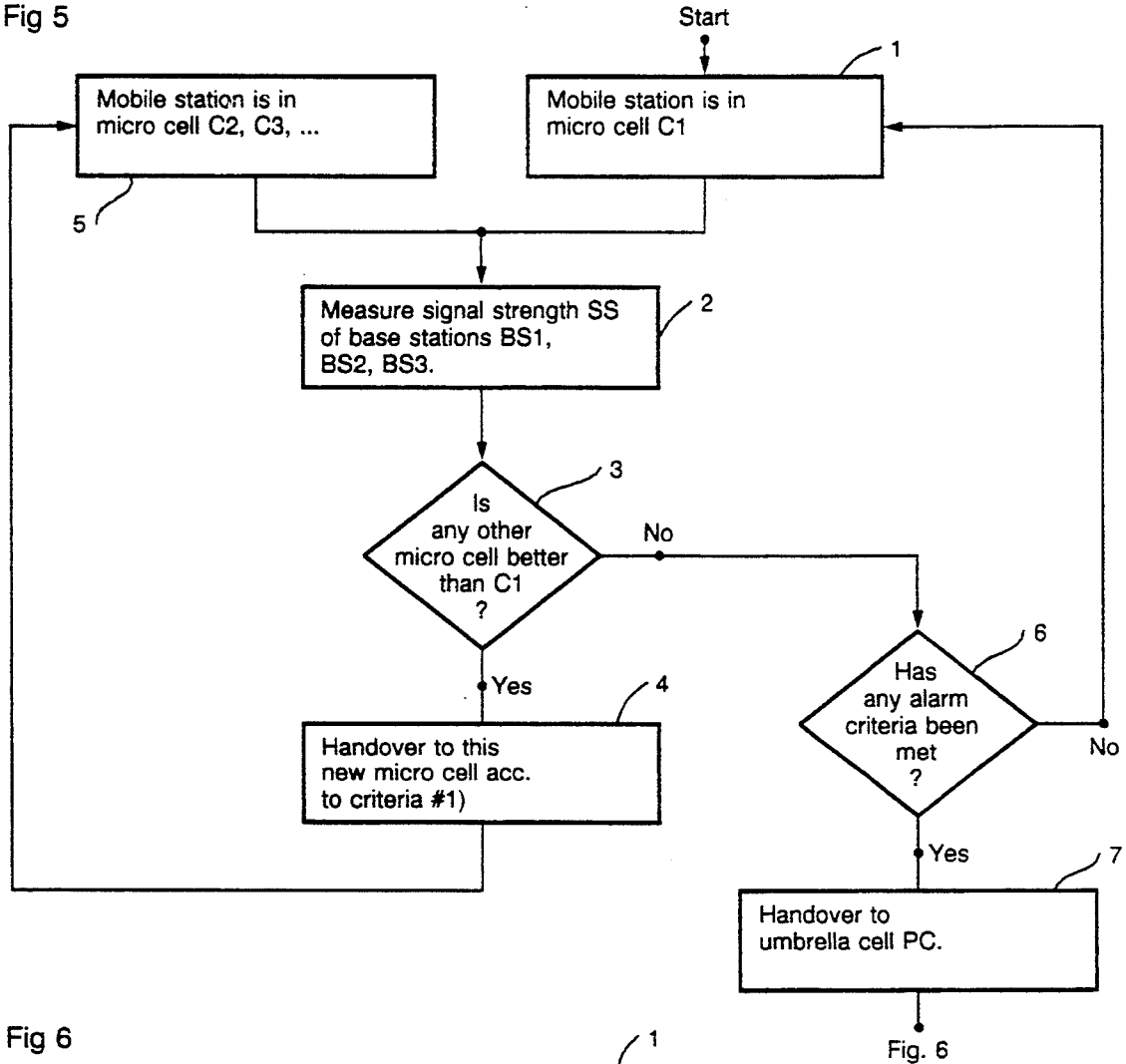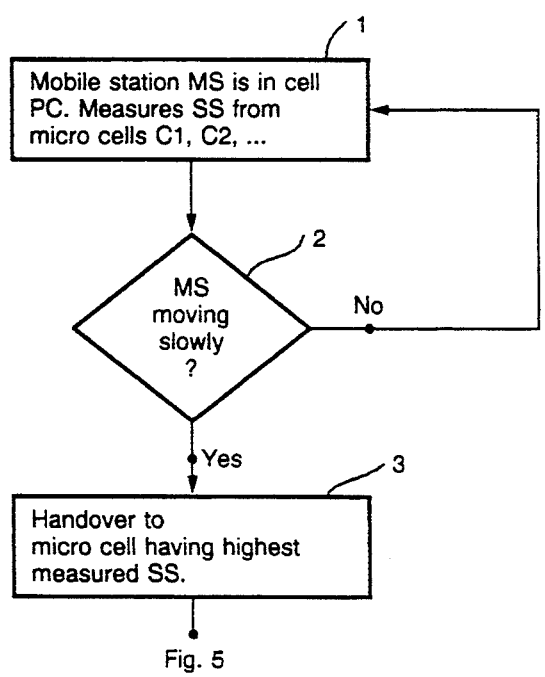

METHOD OF EFFECTING HANDOVER IN A MOBILE MULTILAYER CELLULAR RADIO SYSTEM

FIELD OF THE INVENTION

The present invention relates to a method of effecting handover in a cellular mobile radio system. More specifically, the invention relates to a handover process in a mobile radio system in which the radio cells are divided up into different cell layers.

BACKGROUND OF THE INVENTION

In order to increase the capacity of future mobile radio systems, it is necessary to considerably reduce the size of the cells used in present-day systems. Recent proposals have included the introduction of so-called microcells, by which is meant cells which each have a base station, such as in normal sized cells, although in this case the base station would merely cover an area of about 100–500 meters from. In this case, the vertical height of an erected base station antenna (or antennas) is the same as, for instance, street lighting. Typical use area are town and city centres in which fare density is high and where the surroundings are rich in disturbance sources. Cells of the aforesaid kind can be said to form in common a layer of cells (a microcell layer) over a given larger area.

For indoor use, a smaller cells than microcells can be used, so-called picocells. Each of these cells has a base station which covers an area of about 20–30 meters.

A given layer of cells, e.g. microcells, is covered by a number of normal cells, such that one normal cell (macrocell) will cover at least two microcells. Similarly, one microcell will cover the area of at least two picocells. A covering cell is called an umbrella cell. Thus, a given geographical area, for instance a densely populated area (Greater Stockholm) will be covered by macrocells, microcells and picocells. In this case, one or more macrocells may form the umbrella cells of a number of microcells.

A clear description of the terms used above is found in "ERICSSON REVIEW", No. 1, 1991 pp. 2–9.

SUMMARY OF THE INVENTION

Two kinds of handover are used in mobile radio systems. One kind of handover, intercell handover, pertains to the handover from one cell to another cell and is described below. The other kind of handover, intracell handover, pertains to the handover between different channels belonging to one and the same base station. This type of handover will not be discussed in detail in the present application.

The primary criterion for carrying out an intercell handover is that propagation attenuation between mobile station and transmitting base station exceeds propagation attenuation between mobile station and target base station. The propagation attenuation can be evaluated either by measuring at surrounding base stations the strength of the received signal from the mobile station, or by measuring at the mobile station the strength of the signal received from surrounding base stations.

Several methods for collecting measurement values and handover decisions can be used: NCHO (Network Controlled Handover) in which the mobile is completely passive, MAHO (Mobile Assisted Handover) in which the mobile measures the strengths of received signals, etc. and reports the measured values to the stationary network (mobile telephone exchange, etc.) where a handover decision is then taken, or MCHO (Mobile Controlled Handover) in which the mobile measures the strengths of the received signals, etc. and makes a handover decision on the basis of the results obtained.

These methods presume the identification of a target base station whose signal strength can be measured and to which handover can be effected subsequent to making the decision. Normally, this will not create a problem in normal cell structures and in areas of normal population density.

However, situations can arise in densely populated areas which include a microcell structure where no suitable handover candidate (target base station) can be identified. This may be because the mobile moves along a street or thoroughfare and suddenly swings round a street corner. Handover to a target base station located on the new street cannot be carried out before the aforedescribed necessary measurements have been made, which requires a certain amount of time. Since the original communication link is impaired almost immediately from the time that the mobile turns the street corner, the call can be lost before a handover decision has been made. This sudden change in the radio connection in conjunction with handover thus constitutes a problem in densely populated areas operating with microcells.

The present invention is intended to solve the aforesaid problems in those instances when an umbrella cell is available for those microcells which cover the area in which there may occur changes which are liable to impair the receiving conditions abruptly, such that no specific handover candidate can be identified.

According to one proposed method, handover is effected to the base station which covers a cell that is located in a higher cell layer than the layer in which the mobile is located.

BRIEF DESCRIPTION OF THE DRAWINGS

The invention will now be described in more detail with reference to the accompanying drawings, in which

FIG. 5 is a schematic flow sheet illustrating one example of handover according to the present invention; and FIG. 6 is a flow chart of another example of handover according to the present invention.

DESCRIPTION OF THE PREFERRED EMBODIMENTS

Figure 1:
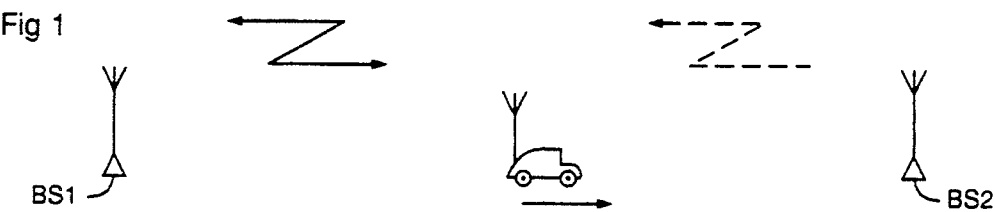
FIG. 1 is a simplified illustration of two base stations and one mobile station.

FIG. 1 illustrates schematically a mobile station MS and two base stations BS1 and BS2 respectively in a cellular mobile telephone system. The system may be a FDMA-system, i.e. a system in which each radio frequency corresponds to one radio channel of a number of radio channels within one cell which is served by a base station BS1 and BS2. The mobile telephone system may also be a TDMA-system or a CDMA-system, where in the former case a radio channel is corresponded by a given carrier frequency and a given time slot (or parts of given time slots). In the CDMA-system, a given radio channel is corresponded by a given carrier frequency and one (or more) time slots, but in which the carrier frequency values and the time slot positions within a frame vary from one of the radio channels to the other in accordance with a code which is particular to the channel.

The mobile station MS is assumed to communicate with the base station BS1 over a given radio channel, although it is also assumed to become further remote from the base station at the same time as the mobile station approaches the base station BS2. When the strength of the signals from MS has fallen beneath a given value, which is measured by BS1 during ongoing communication, the base station BS1 informs that handover to another base station should take place. The mobile telephone exchange compares the signal strength from MS received in BS2 and finds that the base station BS2 is suitable and consequently handover to this station takes place. This handover process applies to present analog systems (FDMA).

In the case of future digital mobile telephone systems of the TDMA-type, for example the pan-European system GSM, handover takes place in accordance with the following principles:
1. $SS_{BS2} > SS_{BS1} + Hysteresis$
2. $SS_{BS1} < $ fixed value
3. $Qual_{BS1} < $ fixed value $^{downlink}$
4. $SS_{MS} < $ fixed value
5. $Qual_{MS} < $ fixed value $^{uplink}$ Normally, only condition 1 is used in GSM. Remaining conditions are alarm conditions and are only used in exceptional cases. If criterion 1 does not function, i.e. no new base station BS2 can be found on the basis of this criterion, one or more of the criteria 2-5 can be used instead to initiate handover.

Each of the base stations BS1 and BS2 in FIG. 1 serves a respective cell. These two cells are normally macrocells having a radius of several kilometers. In a mobile telephone system, the cells may be organized in a multi-layer cell structure according to FIG. 2. In the uppermost layer MAC, the macrocells (the normal cells) are organized in given cell structures in a known manner and with given repetition distances for the channel frequencies used in the system. Although independent of the layer MAC, the microcell layer MIC is organized and planned similar to said macrocell layer, as is also the layer PIC of picocells. A given geographical area is covered by more than one layer. The small cells, i.e. the micro- and picocells, are intended to produce high capacity, whereas the macro- or umbrella cells are intended to provide a wide coverage and improved handover properties.

Figure 3:
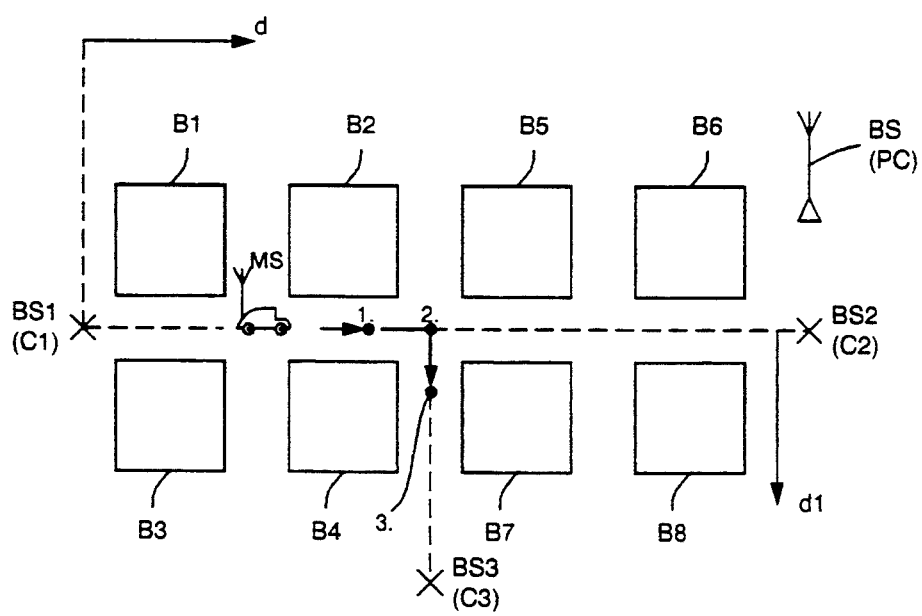
FIG. 3 is a schematic illustration of a street with three microcells and one umbrella cell.
Figure 4:
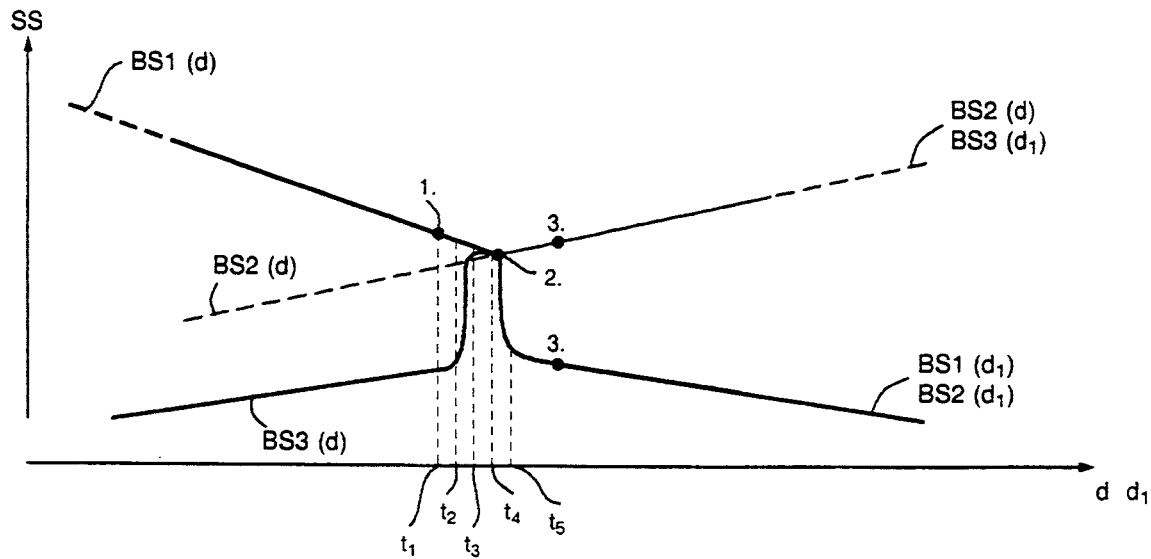
FIG. 4 is a signal strength diagram.

The problem can be illustrated more clearly in FIG. 3 and in the diagram presented in FIG. 4.

FIG. 3 illustrates part of a street network in a highly populated city. The base station BS1 serves a microcell C1 which includes, among other things, the building blocks B1-B4 and associated streets. The base station BS2 serves another microcell C2 which includes, among other things, the building blocks B5-B8 and associated streets. The base station BS3 serves a third microcell C3 which includes the building blocks B4 and B7 and associated streets. The microcells C1-C3 are covered by a common umbrella cell PC which is served by a base station BS.

When a mobile station MS moves in the direction of the arrow in FIG. 3, propagation damping to BS1 increases and propagation damping to BS2 decreases. The signal strength measured in the different base stations (NCHO) or alternatively in the mobile station (MAHO, MCHO) may appear as the path d in the FIG. 4 diagram (path d corresponds to the case where the mobile station MS moves straight towards BS2, while path d1 corresponds to the path from the street crossing towards BS3).

It is now assumed that the mobile approaches the street crossing at blocks B2, B4, B5, B7 and will turn right down towards the base station BS3. The signal strength at point 1 is shown in the FIG. 4 diagram ($t = t_1$). The strength of the signals from BS1 decrease and the strength of the signals from BS2 increase up to the point 2 at which the mobile turns. The signal strength from the base stations BS1 and BS2 has decreased by jumps subsequent to the turn at point 3, see BS1 ($d_1$), BS2 ($d_1$) in FIG. 4.

Also assume that the signal strength from the base stations BS1, BS2 and BS3 have been measured by, for instance, the mobile MS (MAHO) at time points $t_1$, $t_2$, $t_3$, $t_4$ and $t_5$. In this case, there is obtained
a) 4 good measurement values and 1 poor measurement value on BS1;
b) 4 good measurement values (although not as good as in a) and 1 poor measurement value on BS2;
c) 2 poor measurement values and 3 good measurement values on BS3.

The results a)-c) give erroneous information to the mobile MS and therewith also to the mobile telephone exchange where the handover decision is made, since it is obvious in this case that BS3 is the best base station.

No handover based on the criterion 1 is effected on the basis of the results a)-c) above. Instead, alarm according to one or more of the criteria 2 and 3 in MS or 4 and 5 in BS are obtained, possibly after a short delay. This information is delayed and because no suitable handover candidate has been identified, there is a risk that the connection will be interrupted and disengaged instead of being handed over to BS3.

According to the proposed method, handover is made to the base station BS which serves the umbrella cell PC covering the three microcells C1-C3. The base station BS of this umbrella cell is positioned so that the signals transmitted therefrom will be sufficiently strong to reach mobiles essentially at all locations or positions within the area covered by said cell. Thus, if a progressively weaker signal strength is measured in a microcell from the serving base station (BS1) or by the mobile itself (MAHO) and the quality or signal strength according to criteria 2-5 is also impaired on the channel concerned, the conclusion is drawn (in MSC) that it has not been possible to choose a suitable target base station (BS2 or BS3).

This decision is utilized by the mobile telephone exchange MSC which then reaches a decision concerning a handover command to the base station BS of the umbrella cell. The base station BS can always be identified, its signals have sufficient power output and its antenna (or antennas) is/are positioned so as to obtain good coverage over a large area. A handover command is sent either from the old base station BS1, optionally with elevated power output so as to ensure that the command will be received correctly in the mobile, or from the new base station BS (so-called frequency violation).

FIG. 5 is a flow chart sheet which illustrates the inventive method when a handover is made from one microcell to an umbrella cell.

At the "start" the mobile station MS of the FIG. 3 illustration is located somewhere in the street upways of the point 1 and in the area covered by microcell C1, block 1. The mobile station MS is able to measure the strength of signals from bordering base stations BS2, BS3 and transmits the results of these measurements to the base station BS1 which, in turn, transmits to the mobile telephone exchange, block 2 in FIG. 5. The block 2 measurements can be taken continuously by the mobile station (GSM). Subsequent to having taken a given number of measurement values from a given base station, there a mean measurement value is formed for this particular base station. Mean measurement values are also formed for remaining base stations in a similar manner; compare the FIG. 5 diagram.

Subsequent to having formed the mean values in the aforedescribed manner, the mobile telephone exchange is able to decide whether a handover shall take place or not. This decision is reached by comparing the mean measurement values continuously in accordance in accordance with square 3 in FIG. 5. If the base station in some other microcell has a higher signal strength according to criterion 1 above, a handover is made to this base station in a known manner. This case corresponds to "Yes" in square 3 of the FIG. 5 illustration.

If the comparison made in accordance with square 3 fails to show that some other base station has greater signal strength than the base station concerned, "No" two different sets of circumstances are likely to occur:

a) The mobile station MS has good communication with the base station (BS1) concerned and no alarm criterion has been met in the mobile telephone exchange. This case is the normal case and is corresponded in FIG. 5 by "No" from the question square 6.

b) Communication between the mobile station and the base station (BS1) concerned begins to weaken and no better microcell base station is found. This case can be likened to the case described above with reference to FIG. 4, points 2–3, and that alarm criterion according to the criteria 2–5 has been met, "Yes" from square 6 in the FIG. 5 illustration. In this case, the mobile telephone exchange instructs the mobile MS that handover from BS1 to the base station BS of the umbrella cell shall take place. This handover command is transmitted over the base station BS1 to the mobile MS at normal power or at elevated power. As before mentioned, the handover command may also be sent via the new base station BS in the umbrella cell PS, so-called frequency violation, see European Patent Application Publication No. 471656 A2 which is incorporated herein by reference.

Handover is made to the umbrella cell PC in accordance with square 7.

FIG. 6 is a flow chart which illustrates handover in accordance with the present invention when a mobile station is located in an umbrella cell PC, for instance subsequent to the mobile station having made a handover from a microcell (FIG. 5) to its umbrella cell, square 1, at some earlier point in time. In this case, the mobile station measures continuously the signal strength from the base stations BS1, Bs2, BS3 in the microcells C1–C3.

The flow chart according to FIG. 6 is intended to illustrate a case in which the inventive method is applied, namely when the speed of the mobile station in the umbrella cell decides whether handover shall take place or not. Thus, according to square 2, if the mobile station moves slowly, i.e. has a speed $v < v_o$ where $v_o$ is a given, specific speed. The speed of the mobile can be determined by its Doppler spectrum in the base station concerned.

Thus, according to square 2 of the FIG. 6 illustration, it is determined whether the mobile moves slowly or not. If the mobile is not moving slowly "No" the mobile is preferably left in the umbrella cell, since a) the connection may become poor in a microcell according to FIG. 4, and if the mobile were to move quickly, it would rapidly find itself in this state;

b) the mobile may leave a microcell quickly, even though the case according to FIG. 4 may not necessarily occur, and thus make it necessary to handover to another microcell.

These circumstances are avoided when the mobile remains in the umbrella cell.

On the other hand, if the mobile moves slowly (or is in fact stationary), "Yes" it is suitable to handover to a microcell that has the highest measured signal strength, block 3 in FIG. 6, since it is preferred to maintain a high traffic capacity in the umbrella cell. In addition to its roll as an umbrella cell, this cell may also be a macrocell and serve this cell layer.

Figure 2:
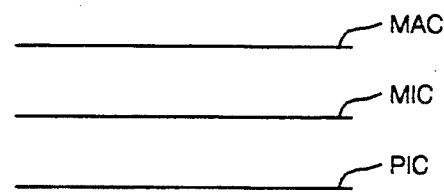
FIG. 2 illustrates schematically three different cell layers.

In certain instances, the umbrella cell may be comprised of several microcells of which each is served by an antenna from a common base station and where a signal common to all antennas is transmitted over a given channel to a given mobile station (so-called simulcast). Such an umbrella cell can be said to cover a given number of microcells, namely those microcells included in the cell and thus belong to the cell layer MAC (FIG. 2). The inventive method is intended to cover also this case.

In the aforegoing, the method has been described with reference to fixed channel distribution in respective cells layers. This is merely an example and it will be understood that the method may also be applied with cell layers in which the channels are distributed dynamically.

We claim:

1. A method of effecting handover in a mobile radio system comprising fixed base stations and mobile stations said radio system includes radio cells wherein the cells are divided into a first layer and a second layer where a cell in the first layer covers a plurality of cells in the second layer, wherein a mobile station moves in a first cell in said second layer towards a second, bordering cell in the second layer and is prepared to handover to said second bordering cell in accordance with certain criteria, comprising the steps of:

measuring signal strength of at least two base stations for said first and said second cell in said second layer of the radio cells;

comparing the measured signal strength of said at least two base stations and selecting the base station corresponding to the highest measured signal strength;

handing over the mobile station from said first cell to said second cell in the second layer when said highest measured signal strength exceeds the signal strength from the base station in said first cell;

handing over the mobile station from the first cell in said second layer to the cell in said first layer which covers at least the first and the second cell in the second layer when the highest measured signal strength does not exceed the signal strength from the base station in said first cell in the second layer and an alarm criteria has been met; and letting the mobile station remain in the first cell in said second layer when said alarm criteria has not been met.

2. A method according to claim 1, wherein handover from said first cell in the second layer to said cell in the first layer is effected by sending a handover command from the base station in the first cell in the second layer to the mobile station of increased power output.

3. A method according to claim 1, wherein handover from said first cell in the second layer to said cell in the first layer is effected by transmitting a handover command from the base station in said cell in the first layer.

* * * * *